(12) United States Patent
Hsieh

(10) Patent No.: US 6,409,283 B1
(45) Date of Patent: Jun. 25, 2002

(54) WHEEL ASSEMBLY FOR A TRUCK-ATTACHED CARRIAGE

(76) Inventor: Yung-Shun Hsieh, No. 15, Lane 493, Sec. 2, Yuan-Chi Rd Yuanlin, Chang-Hua Hsien (TW)

( * ) Notice: Subject to any disclaimer, the term of this patent is extended or adjusted under 35 U.S.C. 154(b) by 0 days.

(21) Appl. No.: 09/798,443

(22) Filed: Mar. 2, 2001

(51) Int. Cl.[7] .............................................. B60B 19/00
(52) U.S. Cl. .............. 301/111.05; 301/118; 301/111.01; 190/18 A
(58) Field of Search ...................... 301/111.01, 111.05, 301/111.06, 111.07, 121, 125, 118; 190/18 A

(56) References Cited

U.S. PATENT DOCUMENTS

| | | | | |
|---|---|---|---|---|
| 884,196 | A | * 4/1908 | McTigue | ..................... 301/118 |
| 2,323,813 | A | * 7/1943 | Fred | ............................ 301/118 |
| 5,673,925 | A | * 10/1997 | Stewart | ....................... 280/279 |
| 5,800,022 | A | * 9/1998 | Del Rosario | ............ 301/118 X |
| 6,253,891 | B1 | * 7/2001 | Miller | ...................... 190/18 A |

* cited by examiner

Primary Examiner—Russell D. Stormer
(74) Attorney, Agent, or Firm—Erik M. Arnhem

(57) ABSTRACT

A wheel assembly for a trunk-attached carriage includes an integrally formed wheel bracket having a vertical, a side and a bottom plate for mounting onto a lower rear corner of a trunk, a compression spring, a short wheel axle, a locking member, and a wheel. The wheel bracket defines a wheel-space for the wheel to locate therein. The wheel axle transversely extends across behind the vertical plate of the wheel bracket to pass through an axle hole on the wheel, so that the wheel is rotatably mounted on the wheel axle and connected the wheel bracket. An end of the wheel axle close to the side plate of the wheel bracket is connected to a diameter-reduced inner end of the locking member, so that the wheel axle can be turned into a locked position on the wheel bracket by turning a diameter-expanded outer end of the locking member. And, by turning the locking member in a reverse direction, the wheel axle can be removed from the wheel bracket for replacement of any damaged component of the wheel assembly.

9 Claims, 6 Drawing Sheets

US 6,409,283 B1

WHEEL ASSEMBLY FOR A TRUCK-ATTACHED CARRIAGE

BACKGROUND OF THE INVENTION

The present invention relates to a wheel assembly for a trunk-attached carriage, and more particularly wheel assembly that can be mass-produced at reduced cost and in efficiency and can be easily assembled to and disassembled rom a trunk-attached carriage no matter what size the trunk is, so that any damaged components of the wheel assembly can be replaced at any time to prolong the usable life of the trunk carriage.

A trunk-attached carriage is very helpful in effortlessly carrying heavy clothes and the like during a trip. Such trunk-attached carriage usually includes two wheel brackets connected to a bottom of the carriage for two wheels o mount thereto. The wheel brackets are normally directly riveted onto the carriage-by some skilled worker and with specific to machinery. Once the wheel brackets and the wheels are mounted onto the carriage, they are not easily dismountable. In the event of any damaged wheel or other component of the wheel bracket, a whole set of the wheel bracket, including the wheel, must be replaced with a new set. From the position of a user, it is not economical to do so.

There has been developed an easily removable wheel assembly for such trunk-attached carriage, allowing a user to easily and quickly assemble and disassemble the wheels and other components on wheel brackets to and from the carriage and therefore a prolonged usable life of the carriage. However, such improved trunk-attached carriage includes a wheel axle having a length of at least 30 centimeters that is equal to an overall width of the wheel assembly. The long wheel axle requires extra material and therefore higher cost to make it, and the wheel assembly must include a seat having a long hole transversely extended a full length of the seat for the long wheel axle to extend therethrough. All these increase the manufacturing cost of the conventional removable wheel assembly. Moreover, it is more difficult to install and align two wheels that are mounted on the same wheel axle. Therefore, the conventional removable wheel assembly is installed at high labor cost and in low productivity.

Another disadvantage of the above-described conventional wheel assembly is that they include two wheel brackets and can be used only with a trunk of matched size. Different molds must be made to produce differently sized wheel assemblies for use with differently sized trunks and therefore increase the cost of the carriage.

It is therefore desirable to develop a wheel assembly that can be mass-produced at reduced cost and high productivity and can be easily assembled to and disassembled from a trunk-attached carriage no matter what size the trunk is, so that any damaged components of the wheel assembly can be replaced at any time to prolong the usable life of the trunk carriage.

SUMMARY OF THE INVENTION

A wheel assembly for a trunk-attached carriage according to the present invention includes an integrally formed wheel bracket having a vertical, a side and a bottom plate for mounting onto a lower rear corner of a trunk, a compression spring, a short wheel axle, a locking member, and a wheel. The wheel bracket defines a wheel space for the wheel to locate therein. The wheel axle transversely extends across the wheel bracket to pass through an axle hole on the wheel, so that the wheel is rotatably mounted on the wheel axle and connected the wheel bracket. An end of the wheel axle close to the side plate of the wheel bracket is connected to a diameter-reduced inner end of the locking member, so that the wheel axle can be turned into a locked position on the wheel bracket by turning a diameter-expanded outer end of the locking member. And, by turning the locking member in a reverse direction, the wheel axle can be removed from the wheel bracket for replacement of any damaged component of the wheel assembly.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
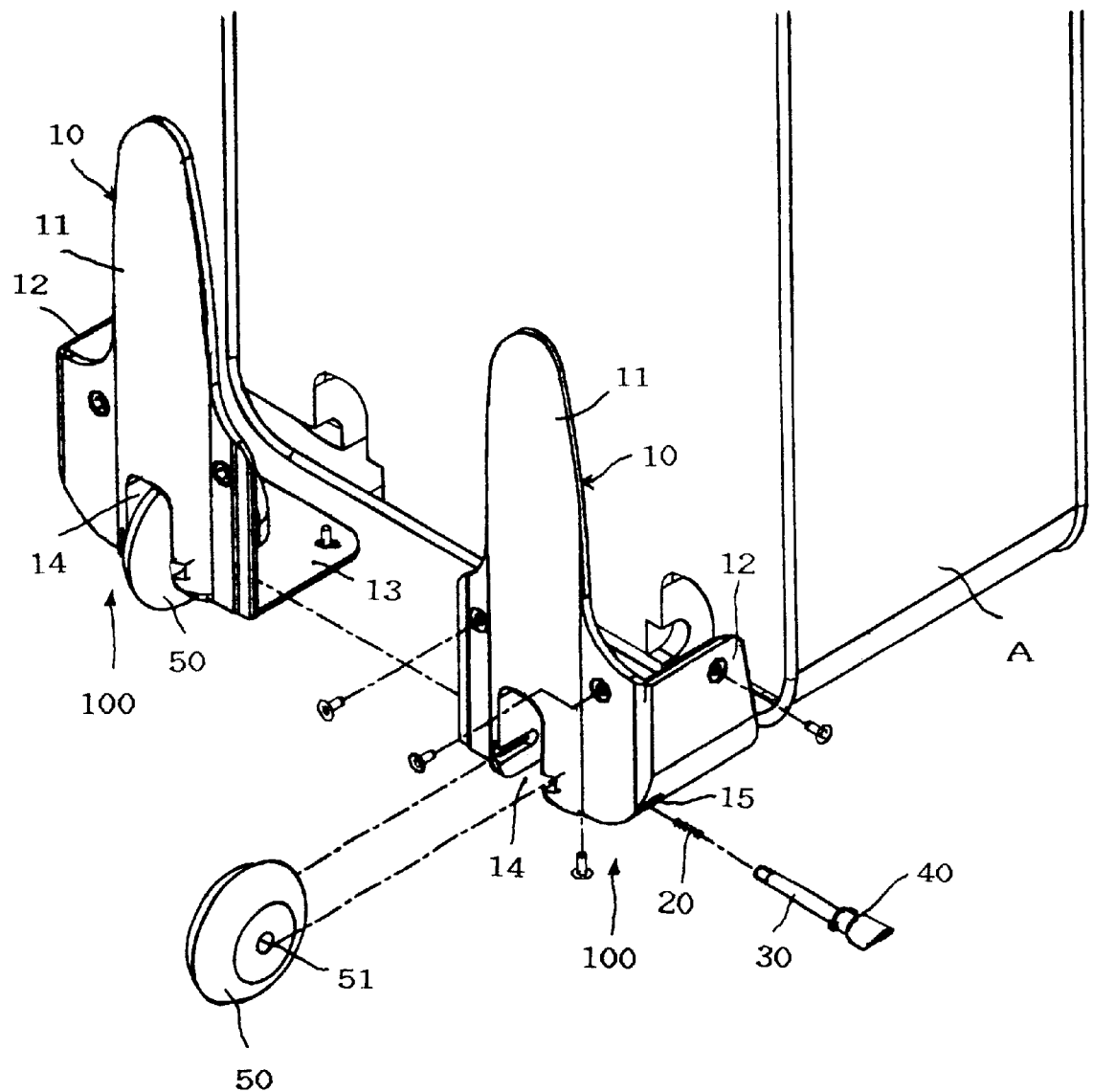
FIG. 1 is an exploded perspective showing two wheel assemblies of the present invention for mounting onto a backside of a trunk.

Please refer to FIG. 1 Two wheel assemblies (100) according to the present invention are separately mounted onto two lower corners of a backside of a trunk (A) to connect to a carriage (not shown) invisibly mounted in the trunk (A). An advantage of the wheel assemblies (10) is that they could be mounted on the trunk (A) of any size. Therefore, it is no need to make different molds for manufacturing differently sized wheel assemblies (100) and a large amount of cost for making molds can be saved.

Figure 2:
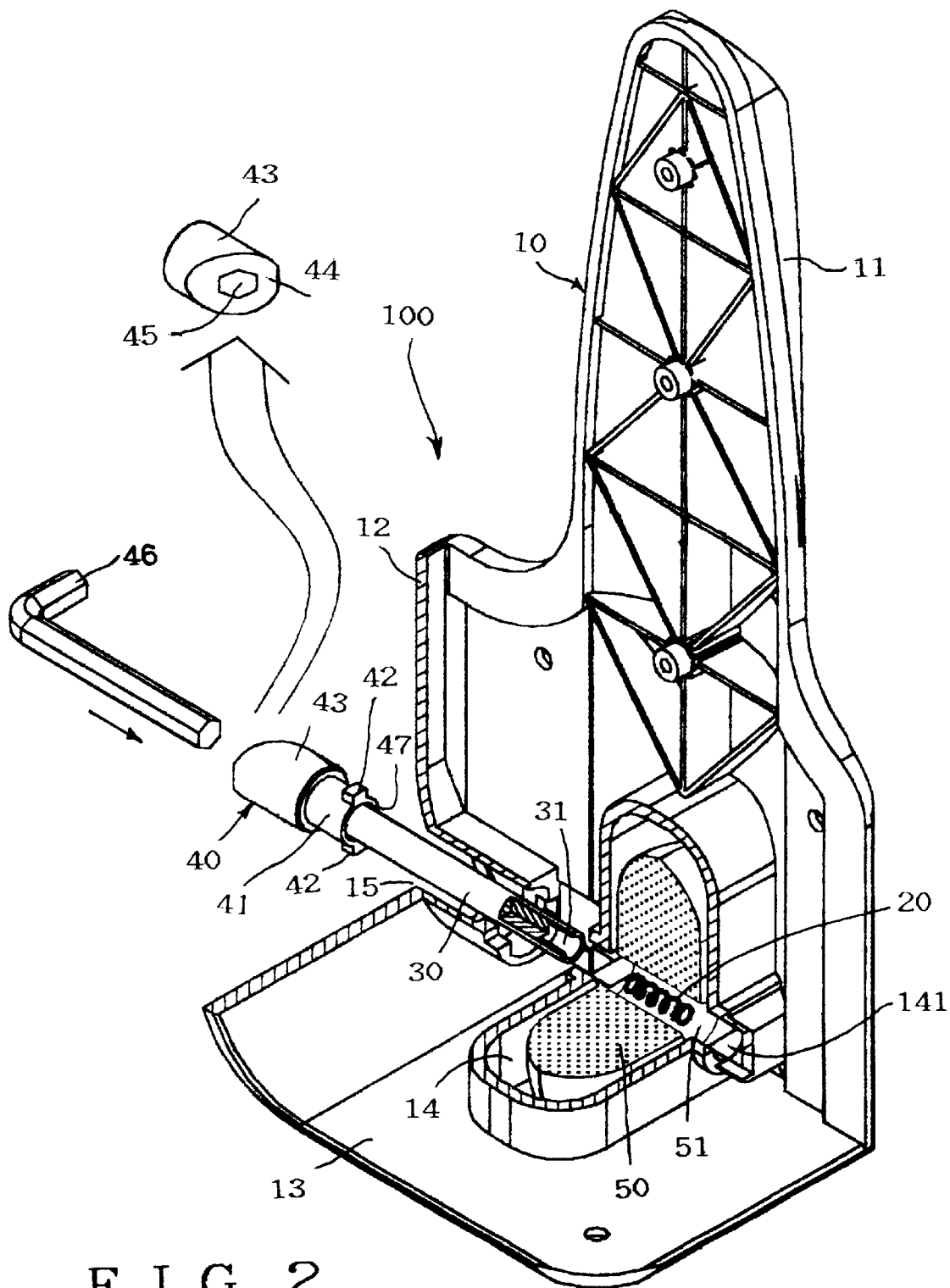
FIG. 2 shows the manner of extending a locking member into a wheel bracket of the present invention.

As can be seen in FIGS. 1 and 2, each of the wheel assemblies (100) mainly includes a wheel bracket (10), a compression spring (20), a short wheel axle (30), a locking member (40), and a wheel (50).

The wheel bracket (10) is an integrally formed member and includes a vertical plate (11), a side plate (12) and a bottom plate (13) which respectively correspond to a back surface, a side surface, and a bottom surface of the trunk (A) for fitly mounting onto a lower rear corner of the trunk (A) by means of screws or rivets. Portions of the vertical and the bottom plates (11), (13) of the wheel bracket (10) at an interface between them are inward extended to provide a wheel space (14) for the wheel (50) to locate therein. An inner wall surface of an innermost wall of the wheel space (14) opposite to the side plate (12) of the wheel bracket (10) is provided with a fixing channel (141) against which an inner end of the compression spring (20) presses.

An axle-receiving channel (15) is provided at a lower part of the wheel bracket (10) at one side thereof. When the wheel (50) is located in the wheel space (14), the wheel axle (30) is extended into the axle-receiving channel (15) and through an axle hole (51) on the wheel (50), so that the wheel (50) is rotatably mounted on the wheel axle (30) and connected to the wheel bracket (10) to complete the wheel assembly (100) of the present invention.

Figure 6:
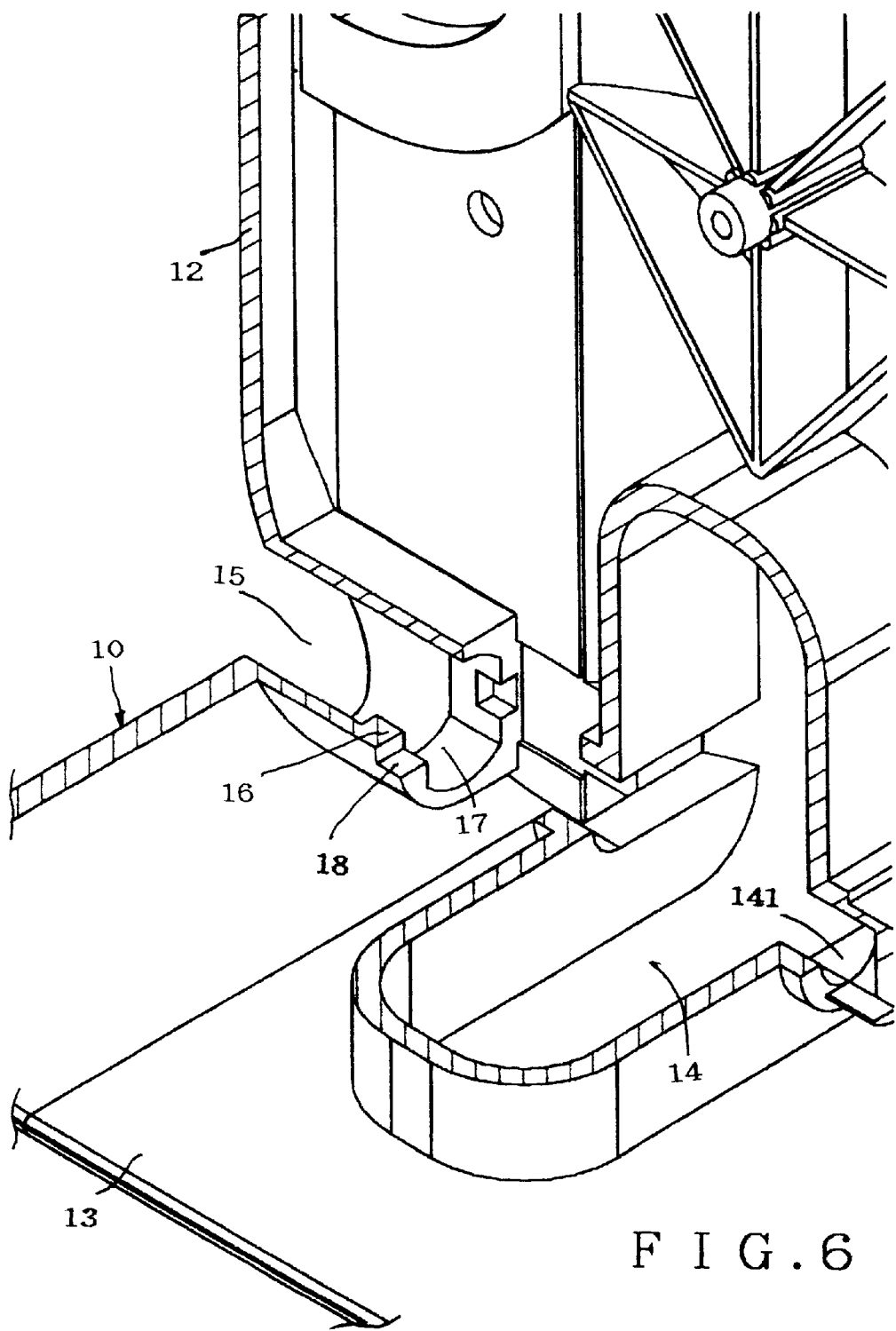
FIG. 6 is a fragmentary rear perspective view of the wheel bracket of the wheel assembly of the present invention with a part thereof cut away to show an internal structure thereof.

Please refer to FIGS. 1, 2 and 6 at the same time. The axle-receiving channel (15) is provided on two opposite inner wall surfaces near a lower part thereof with two stoppers (16), so that a substantially rectangular guiding hole (17) is formed at the lower part of the axle-receiving channel (15). An inner end of the axle-receiving channel (15) extended beyond the two stoppers (16) forms a U-shaped stopper (18). The provision of the stoppers (16), the guiding hole (17) and the U-shaped stopper (18) will be explained later.

The wheel axle (30) has a short length slightly larger than an overall width of the wheel (50) (about 5 centimeters). The short length of the wheel axle (30) enables it to be made with largely reduced material and widely used with differently sized trunks. An inner end of the wheel axle (30) is provided with an axial cavity (31) into which an outer end of the compression spring (20) is received. An outer end of the wheel axle (30) opposite to the inner end is inserted into a fixing hole (47) centered in a locking body (41) of the locking member (40), such that the locking member (40), the wheel axle (30), and the compression spring (20) are sequentially connected to form a unit. In practice, the wheel axle (30) and the locking member (40) may also be integrally formed through molding.

The locking member (40) shown in the drawings includes an outer end that has expanded outer diameter to provide a cylindrical knob (43). An outermost end of the cylindrical knob (43) is a bevel surface (44) that enables the outer end of the locking member (40) to flush with an outer surface of the wheel bracket (10) when the locking member (40) is in a locked position in the axle-receiving channel (15), so as to give the whole wheel assembly (100) a beautiful appearance. The cylindrical knob (43) is provided at a center of the bevel outer end surface (44) with an axially extended hexagonal hole (45). By extending a hex wrench (46) into the hexagonal hole (45) and turning the hex wrench (46), the locking member (40) can be rotated while moved into the axle-receiving channel (15). An inner end of the locking member (40) has a reduced outer diameter, compared with the cylindrical knob (43), and forms a cylindrical locking body (41). The cylindrical locking body (41) is provided at an inner end peripheral wall with two diametrically opposite and radially outward projected lugs (42).

Figure 3:
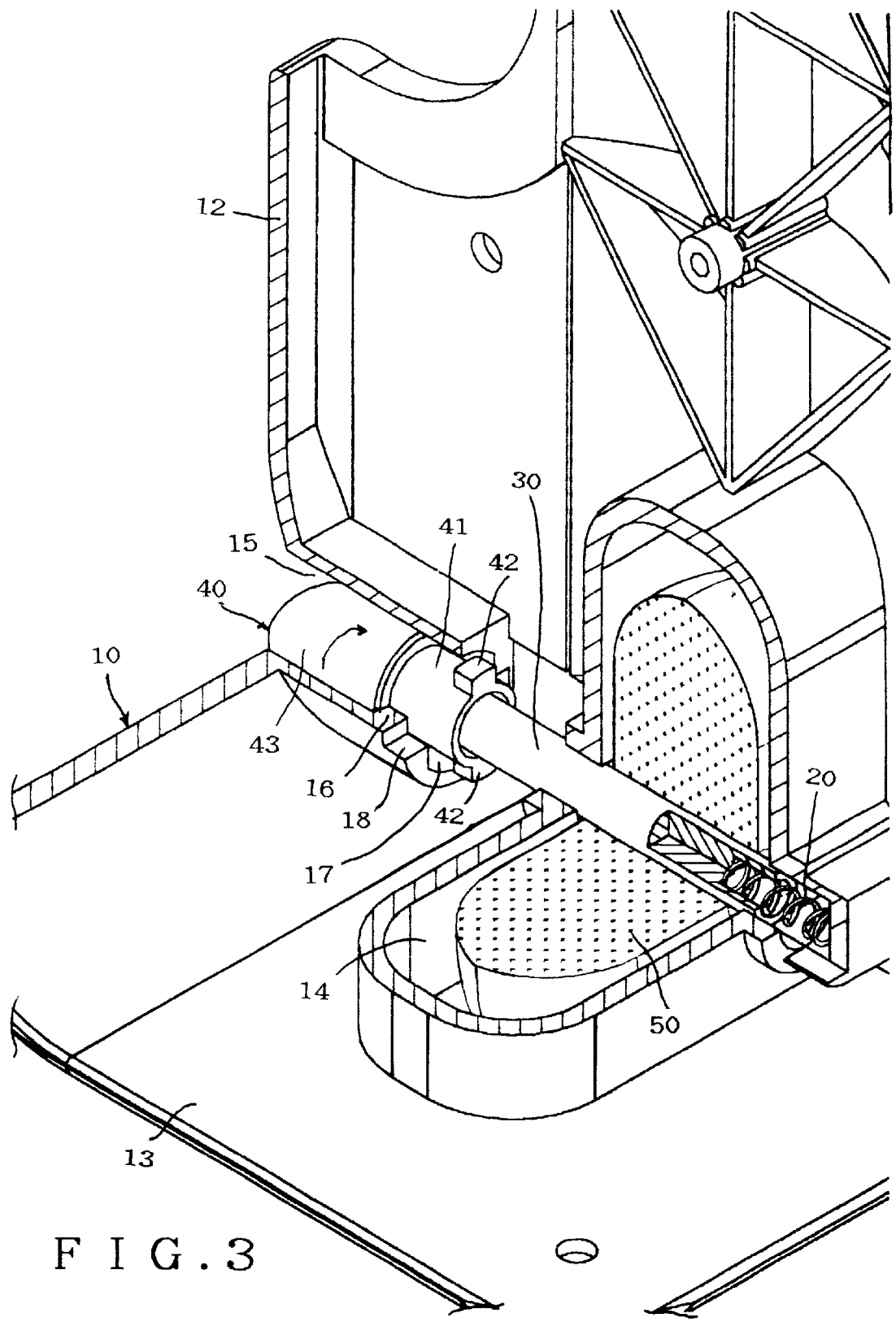
FIG. 3 shows the locking member of FIG. 2 is turned by 90 degrees after it has been fully extended into the wheel bracket.
Figure 4:
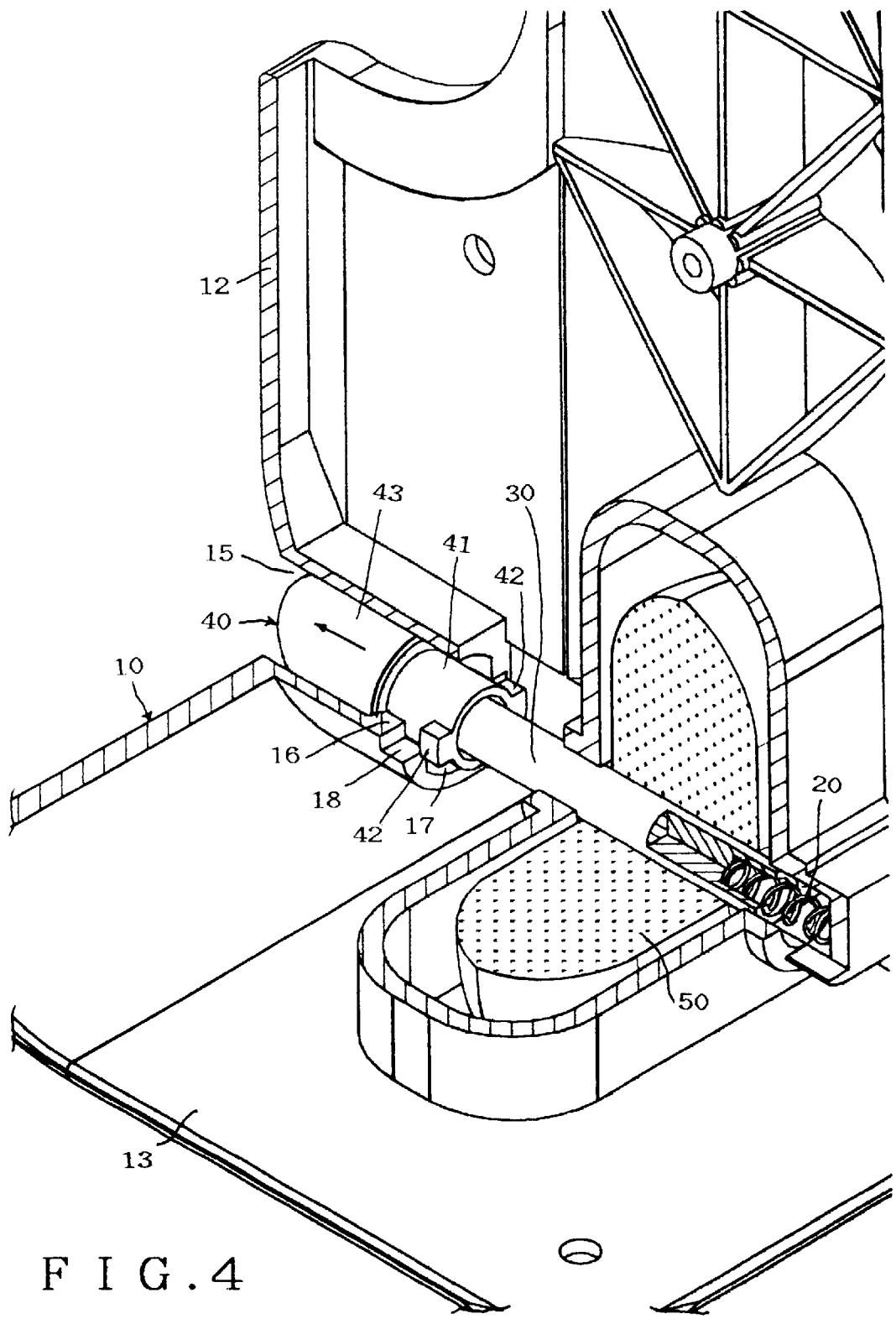
FIG. 4 shows the locking member of FIG. 3 is pushed outward by a compression spring mounted in the wheel bracket.
Figure 5:
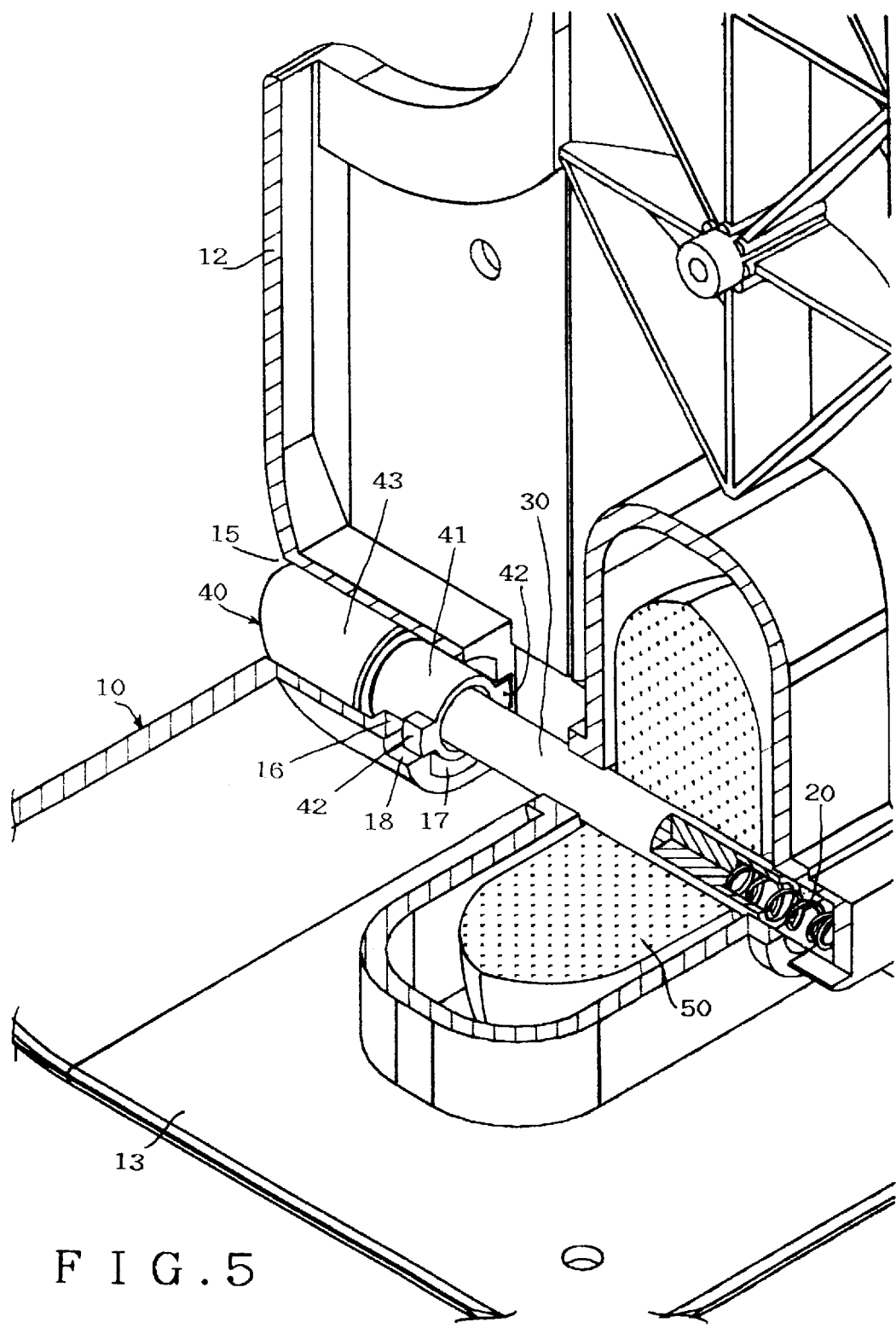
FIG. 5 shows the locking member of FIG. 4 is moved into a locked position on the wheel bracket.

When the serially connected locking member (40), the wheel axle (30) and the compression spring (20) as a unit is fully extended into the axle-receiving channel (15), the wheel axle (30) is extended through the axle hole (51) of the wheel (50) located in the wheel space (14) and the inner end of the compression spring (20) is extended into and pressed against the fixing channel (141) in the wheel space (14), so that the wheel (50) is rotatably mounted on the wheel axle (30) and connected to the wheel bracket (10). Please note, the locking member (40) is extended into the axle-receiving channel (15) with the two lugs (42) at the inner end of the locking body (41) aligned with a line normal to the bottom plate (13) of the wheel bracket (10), as shown in FIG. 2. When the locking body (41) with the two lugs (42) enters into the rectangular guiding hole (17), the cylindrical knob (43) that has expanded outer diameter is stopped by the two stoppers (16) from moving inward any further and stays in the axle-receiving channel (15). At this point, the locking member (40) is turned by 90 degrees with the hex wrench (46), as shown in FIG. 3, so that the two lugs (42) on the locking body (41) are moved from a vertical position into a horizontal position in the guiding hole (17). At this point, loosening of the hex wrench (46) will allow the compression spring (20) to elastically push the wheel axle (30) and the locking member (40) outward, as shown in FIG. 4, until the two lugs (42) are brought into the U-shaped stopper (18), as shown in FIG. 5. At this point, the unit of the locking member (40), the wheel axle (30) and the compression spring (20) and the wheel (50) are securely connected to the wheel bracket (10) without the risk of easily separating therefrom. And, by turning the locking member (40) with the hex wrench (46) in a reverse direction by 90 degrees, the locking member (40) and accordingly the wheel axle (30) and the compression spring (20) could be easily removed out of the axle-receiving channel (15) for the purpose of replacing damaged components of the wheel assembly (100).

The above-described wheel assembly for a trunk-attached carriage has simple but novel structure and can be easily disassembled for the purpose of replacement of any damaged components thereof. The present invention is therefore practical for use and industrially valuable.

What is claimed is:

1. A wheel assembly for a trunk-attached carriage that usually includes two wheels, comprising:

an integrally formed wheel bracket having a vertical plate, a side plate and a bottom plate respectively corresponding to a back surface, a side surface, and a bottom surface of a trunk for fitly mounting onto a lower rear corner of said trunk by means of screws or rivets;

a compression spring;

a wheel axle extended across said wheel bracket at a predetermined position and having a first end provided with an axial cavity for receiving a first end of said compression spring therein;

a locking member having a first end that has an expanded outer diameter to provide a cylindrical knob that is accessible from outside of said wheel bracket, and a second end that has a reduced outer diameter compared with said first end to provide a cylindrical locking body, and said locking body being provided with an axially extended central fixing hole for receiving a second end of said wheel axle; and a wheel rotatably mounted on said wheel axle in said wheel bracket; and said wheel assembly being able to the easily assembled and dis-assembled for the purpose of replacement of any damaged components thereof, so that said wheel assembly and said trunk-attached carriage could be produced at reduced cost and high productivity and has prolonged useable life.

2. A wheel assembly for a trunk-attached carriage as claimed in claim 1, wherein portions of said vertical and said bottom plates of said wheel bracket at an interface therebetween are formed into a wheel space behind said vertical plate for said wheel to locate therein.

3. A wheel assembly for a trunk-attached carriage as claimed in claim 2, wherein said wheel space is provided on an inner wall surface of an innermost wall thereof opposite to said side plate of said wheel bracket with a fixing channel, against which a second end of said compression spring presses.

4. A wheel assembly for a trunk-attached carriage as claimed in claim 1, wherein said wheel bracket is provided at a lower part of its one side with an axle-receiving channel, and said axle-receiving channel being provided on two opposite inner wall surfaces near a lower part thereof with two stoppers, so that a substantially rectangular guiding hole is formed at the lower part of said axle-receiving channel.

5. A wheel assembly for a trunk-attached carriage as claimed in claim 4, wherein said axle-receiving channel has an inner end extended beyond said two stoppers to form a U-shaped stopper.

6. A wheel assembly for a trunk-attached carriage as claimed in claim 1, wherein said cylindrical locking body of said locking member is provided at an inner end peripheral wall with two diametrically opposite and radially outward projected lugs adapted to locate in and abut against said U-shaped stopper.

7. A wheel assembly for a trunk-attached carriage as claimed in claim 1, wherein said cylindrical knob of said locking member has a beveled outer end surface opposite to said cylindrical locking body.

8. A wheel assembly for a trunk-attached carriage as claimed in claim 7, wherein said beveled outer end surface of said cylindrical knob of said locking member is provided at a central area with a hexagonal hole.

9. A wheel assembly for a trunk-attached carriage as claimed in claim 1, wherein said wheel axle and said locking member are integrally formed into one body through molding.

* * * * *